US012287008B2

(12) United States Patent
Ito et al.

(10) Patent No.: US 12,287,008 B2
(45) Date of Patent: Apr. 29, 2025

(54) GREASE COMPOSITION AND ROLLING DEVICE

(71) Applicant: NSK LTD., Tokyo (JP)

(72) Inventors: Azuma Ito, Fujisawa (JP); Tomoaki Matsumoto, Fujisawa (JP); Haruhisa Ashida, Fukuroi (JP)

(73) Assignee: NSK LTD., Tokyo (JP)

( * ) Notice: Subject to any disclaimer, the term of this patent is extended or adjusted under 35 U.S.C. 154(b) by 88 days.

(21) Appl. No.: 18/037,699

(22) PCT Filed: Nov. 19, 2021

(86) PCT No.: PCT/JP2021/042603
§ 371 (c)(1),
(2) Date: May 18, 2023

(87) PCT Pub. No.: WO2022/107882
PCT Pub. Date: May 27, 2022

(65) Prior Publication Data
US 2024/0026927 A1    Jan. 25, 2024

(30) Foreign Application Priority Data
Nov. 20, 2020    (JP) ................................. 2020-193495

(51) Int. Cl.
*F16C 33/66*    (2006.01)
*C10M 169/02*    (2006.01)

(52) U.S. Cl.
CPC ....... *F16C 33/6633* (2013.01); *C10M 169/02* (2013.01)

(58) Field of Classification Search
CPC . F16C 33/6633; F16C 19/186; C10M 169/02; C10M 145/14; C10M 2209/084; C10N 2040/02
See application file for complete search history.

(56) References Cited

U.S. PATENT DOCUMENTS

2004/0132629 A1*    7/2004    Vinci ................. C10M 169/044
508/591
2008/0106041 A1    5/2008    Shibayama et al.
(Continued)

FOREIGN PATENT DOCUMENTS

EP    2 687 761 A1    1/2014
JP    2008-32116 A    2/2008
(Continued)

OTHER PUBLICATIONS

Extended European Search Report dated Apr. 2, 2024 in European Application No. 21894753.9.
(Continued)

*Primary Examiner* — Ellen M McAvoy
(74) *Attorney, Agent, or Firm* — Sughrue Mion, PLLC

(57) ABSTRACT

Provided are a grease composition and a rolling device which can prevent a decrease in seal performance even when a low-viscosity base oil having, for example, a kinematic viscosity of 5 to 40 mm2/s is used, and can achieve both seal performance and low torque. A seal member (12a) has a plurality of seal lips (114), (115), and (116) made of an elastic material, and a grease composition is sealed in gap portions (121) and (122) between a sliding surface of a slinger (106) on which the seal lips slide and the two adjacent seal lips. The grease composition contains a base oil and a polar polymer, and a weight-average molecular weight of the polar polymer is from 5000 to 140000.

8 Claims, 3 Drawing Sheets

(56) References Cited

U.S. PATENT DOCUMENTS

| | | | | |
|---|---|---|---|---|
| 2011/0136578 A1* | 6/2011 | Kawamura | ............ | F16D 3/223 |
| | | | | 508/370 |
| 2011/0306429 A1* | 12/2011 | Mikami | ................ | F16C 33/104 |
| | | | | 464/7 |
| 2014/0011718 A1* | 1/2014 | Meijer | ................. | C10M 169/06 |
| | | | | 508/110 |
| 2015/0045272 A1* | 2/2015 | Fujimaki | ............. | C10M 141/06 |
| | | | | 508/503 |
| 2018/0016516 A1* | 1/2018 | Sawaguchi | ......... | C10M 117/02 |
| 2019/0106645 A1* | 4/2019 | Aoki | .................... | C10M 101/02 |
| 2019/0119595 A1* | 4/2019 | Tanaka | ................ | C10M 145/14 |
| 2020/0208075 A1* | 7/2020 | Watanabe | ........... | C10M 169/02 |
| 2020/0332215 A1* | 10/2020 | Sawaguchi | ......... | C10M 105/18 |
| 2022/0145203 A1* | 5/2022 | Watanabe | ............ | C10M 171/06 |

FOREIGN PATENT DOCUMENTS

| | | |
|---|---|---|
| JP | 2008-120855 A | 5/2008 |
| JP | 2010-174117 A | 8/2010 |
| JP | 2012-107758 A | 6/2012 |
| JP | 2012-193835 A | 10/2012 |
| JP | 2013-129794 A | 7/2013 |
| JP | 5383392 B2 | 10/2013 |
| JP | 2015-75180 A | 4/2015 |
| JP | 2019-172984 A | 10/2019 |

OTHER PUBLICATIONS

Office Action issued by the Japanese Patent Office on Sep. 6, 2022 in counterpart Japanese Patent Application No. 2022-543586.
International Search Report (PCT/ISA/210) issued on Jan. 18, 2022 by the International Searching Authority in counterpart International Patent Application No. PCT/JP2021/042603.
Written Opinion(PCT/ISA/237) issued on Jan. 18, 2022 by the International Searching Authority in counterpart International Patent Application No. PCT/JP2021/042603.

\* cited by examiner

GREASE COMPOSITION AND ROLLING DEVICE

CROSS REFERENCE TO RELATED APPLICATIONS

This application is a National Stage of International Application No. PCT/JP2021/042603 filed on Nov. 19, 2021, claiming priority from Japanese Patent Application No. 2020-193495 filed on Nov. 20, 2020, the disclosures of which are incorporated herein in their entirety by reference.

TECHNICAL FIELD

The present disclosure relates to a grease composition used in a seal member or a seal device of a rolling device and a rolling device.

BACKGROUND ART

A wheel rolling device for supporting wheels of an automobile or a railway vehicle is usually used outdoors while being exposed to rainwater, muddy water, or the like. Therefore, in the wheel rolling device in the related art, for the purpose of preventing the rainwater, the muddy water, and the like from entering inside a bearing and sealing grease sealed inside of the bearing, a seal member for closing an opening end portion between a pair of bearing rings is disposed.

Incidentally, in recent years, as an effort to improve fuel efficiency of an automobile, a reduction in friction between a seal member and a surface on which a seal lip of the seal member slides (low torque) is required.

For example, Patent Literature 1 proposes a seal structure of a rotary member in which grease having a base oil kinematic viscosity at 40° C. of 10 to 60 mm$^2$/s is applied to a surface with which a seal lip is in sliding contact. Further, in the above-described seal structure, a surface with which the seal lip is in sliding contact is formed as an uneven surface provided with a large number of dimples, and a surface roughness Ra in which an oil film of the grease is maintained is 0.5 to 1.5 μm even when a pressure is applied by the seal lip, and according to the seal structure, by lowering a viscosity of the base oil, it is possible to reduce rotation torque while maintaining seal performance, and since the grease is held in an uneven portion, it is possible to prevent breakage of the oil film of the grease even when the pressure applied by the seal lip acts on the surface with which the seal lip is in sliding contact.

However, in the seal member disclosed in Patent Literature 1, since unevenness is formed on a surface on the other side with which the seal lip is in sliding contact, the seal lip slides against the unevenness, sliding wear of the seal lip is accelerated, and as a result, the seal performance (sealing performance) deteriorates.

In addition, Patent Literature 2 proposes a sealing device in which occurrence of sliding wear of a seal lip is reduced. The sealing device is provided with three seal lips, and unevennesses are formed on sliding surfaces on sides of the three seal lips, and a space between the three seal lips is filled with low-viscosity base oil grease. Further, Patent Literature 2 discloses that a base oil used in the sealing device preferably has a base oil kinematic viscosity at 40° C. of 10 to 40 mm$^2$/s.

CITATION LIST

Patent Literature

Patent Literature 1: JP2012-107758A
Patent Literature 2: JP2012-193835A

SUMMARY OF INVENTION

Technical Problem

However, when the sealing device disclosed in Patent Literature 2 is used, and when the base oil kinematic viscosity at 40° C. is less than 10 mm$^2$/s, fluidity of the grease composition is large, and the grease may not be held in the unevenness. That is, since the grease is likely to be sprayed due to the sliding, desired seal performance cannot be maintained.

The present disclosure has been made in view of the above problems, and an object of the present disclosure is to provide a grease composition and a rolling device which can prevent a decrease in seal performance even when a low-viscosity base oil having, for example, a kinematic viscosity of 5 to 40 mm$^2$/s is used, and can achieve both seal performance and low torque.

Solution to Problem

As a result of extensive studies to solve the above problems, the present inventors have found that, by containing a polar polymer having a specific weight-average molecular weight in a grease composition used in a seal portion of a rolling device, seal performance can be improved, and even when a low-viscosity base oil having a kinematic viscosity at 40° C. of 5 to 40 mm$^2$/s is used, rotational resistance generated during sliding between a lip portion of a seal and a surface on which the lip portion of the seal slides can be reduced (low torque achieved) without impairing the seal performance.

That is, since the grease composition contains the low-viscosity base oil having the kinematic viscosity at 40° C. of 5 to 40 mm$^2$/s and the polar polymer, an oil film can be stably formed on a sliding surface of the seal lip while maintaining low torque.

There are two effects obtained by containing the polar polymer in the grease composition. The first point is that an oil film thickness can be increased by a thickening effect of a polymer. The second point is that an electrostatic force acts between the seal lip and the sliding surface and the grease due to a polar group of the polar polymer, and wettability is improved, such that the grease can be held on the sliding surface.

In addition, even when a low-polarity synthetic hydrocarbon-based oil or the like is used as the base oil, by using the polar polymer, since the polar polymer functions as a surfactant, an electrostatic interaction acts between the polar group of the polar polymer and a polar group of a thickener, and an interaction such as a van der Waals force acts between a non-polar group of the polar polymer and the base oil. As a result, since the polar polymer functions as the surfactant, the wettability of the thickener to the base oil can be improved. As a result, it is possible to prevent the grease composition from being sprayed from a sliding portion during sliding.

The present disclosure has been made based on these findings.

That is, the object of the present disclosure is achieved by the following configuration [1] related to a grease composition.

[1] A grease composition to be used in a rolling device including a pair of bearing rings having a pair of opposing raceway surfaces, a plurality of rolling elements rollably held between the pair of raceway surfaces, and a seal member closing an opening end portion of a space formed between the pair of bearing rings, in which the seal member has a plurality of seal lips made of an elastic material, in which the grease composition is filled in a gap portion between a sliding surface on which the seal lips of one of the pair of bearing rings slides and two adjacent seal lips, and the grease composition contains:
a base oil; and a polar polymer, in which
a weight-average molecular weight of the polar polymer is from 5000 to 140000.

A preferred embodiment according to the present disclosure relating to the grease composition relates to the following [2] to [4].

[2] The grease composition according to [1], in which a kinematic viscosity of the base oil at 40° C. is 5 mm$^2$/s or more and 40 mm$^2$/s or less.

[3] The grease composition according to claim [1] or [2], in which the polar polymer is at least one selected from polyacrylate, polymethacrylate, styrene-maleic anhydride copolymer, olefin-maleic anhydride copolymer, polyurethane, polyester, and ethylene oxide-propylene oxide copolymer.

[4] The grease composition according to claim [3], in which the polar polymer is at least one selected from polyacrylate and polymethacrylate.

Further, the object of the present disclosure is achieved by the following configuration [5] related to a rolling device.

[5] A rolling device includes: a pair of bearing rings having a pair of opposing raceway surfaces; a plurality of rolling elements rollably held between the pair of raceway surfaces; and a seal member closing an opening end portion of a space formed between the pair of bearing rings, the seal member having a plurality of seal lips made of an elastic material, in which a grease composition is filled in a gap portion between a sliding surface on which the seal lips of one of the pair of bearing rings slides and two adjacent seal lips,
the grease composition contains a base oil and a polar polymer, and
a weight-average molecular weight of the polar polymer is from 5000 to 140000.

Advantageous Effects of Invention

According to the present disclosure, since a grease composition contains a polar polymer, and a weight-average molecular weight of the polar polymer is appropriately controlled, it is possible to provide a grease composition and a rolling device which can prevent a decrease in seal performance even when a low-viscosity base oil having, for example, a kinematic viscosity of 5 to 40 mm$^2$/s is used, and can achieve both seal performance and low torque.

DESCRIPTION OF EMBODIMENTS

Hereinafter, an embodiment of the present disclosure will be described in detail. The present disclosure is not limited to the embodiment described below.

[1. Rolling Device, Seal Device, and Seal Member]

First, a rolling device, a seal device, and a seal member according to the embodiment will be described in detail.

Figure 1:
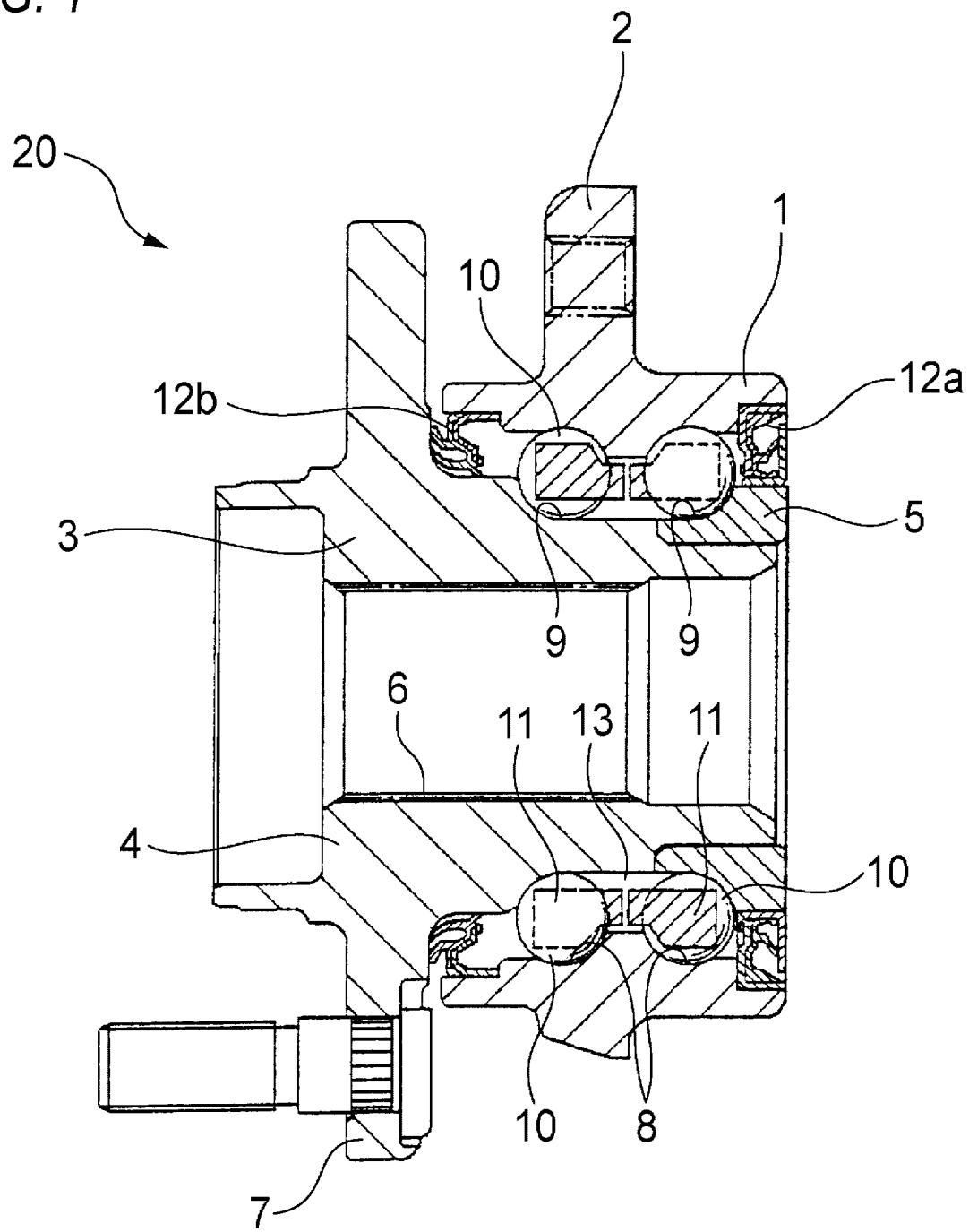
FIG. 1 is a cross-sectional view showing a rolling device (a wheel rolling device) according to an embodiment of the present disclosure.
Figure 2:
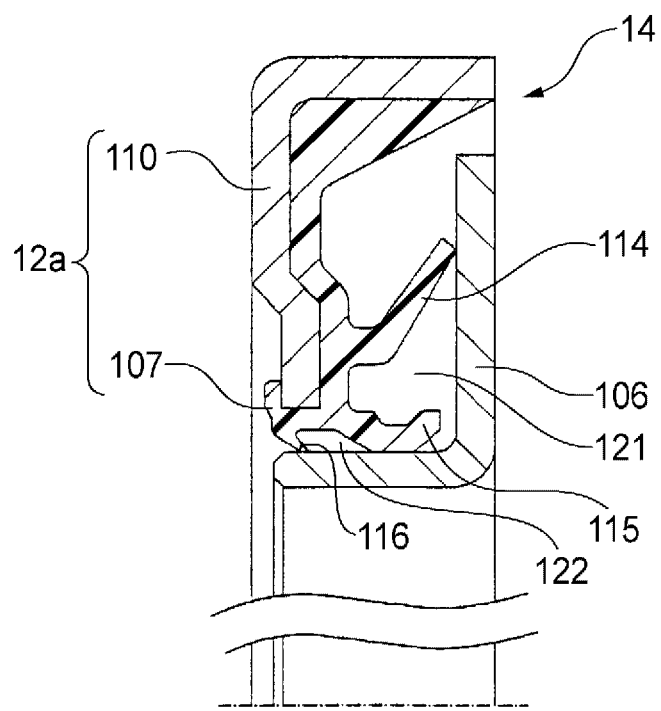
FIG. 2 is a cross-sectional view showing an enlarged seal device in the rolling device according to the embodiment of the present disclosure.
Figure 3:
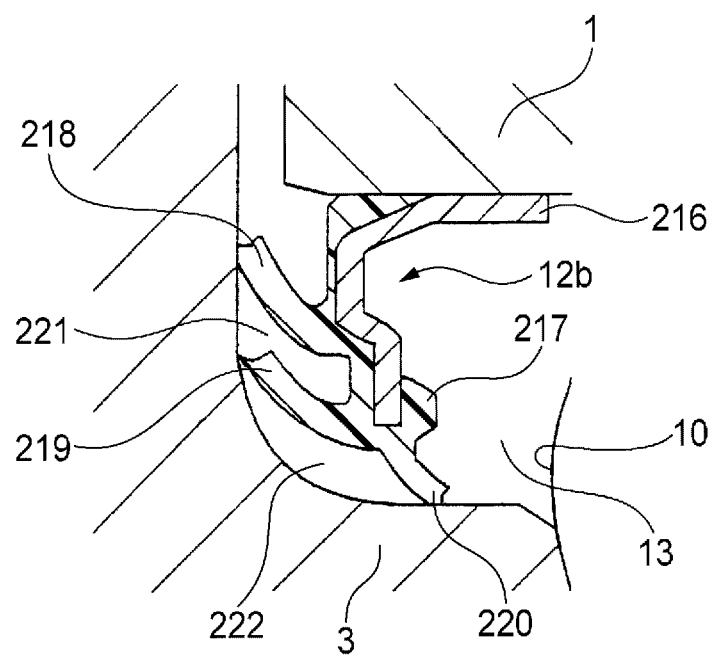
FIG. 3 is a cross-sectional view showing an enlarged seal member in the rolling device according to the embodiment of the present disclosure.

FIG. 1 is a cross-sectional view showing the rolling device according to the embodiment of the present disclosure. FIG. 2 is a cross-sectional view showing an enlarged seal device in the rolling device according to the embodiment of the present disclosure. In addition, FIG. 3 is a cross-sectional view showing an enlarged seal member in the rolling device according to the embodiment of the present disclosure. In the embodiment, a "wheel rolling device" will be described as an example of the rolling device.

As shown in FIG. 1, a rolling device 20 includes an outer bearing ring 1 that is a fixed ring and an inner bearing ring 3 that is a rotary ring, and constitutes a pair of bearing rings. The outer bearing ring 1 is supported and fixed to a suspension device (not shown) by a mounting portion 2 formed on an outer peripheral surface of the outer bearing ring 1.

On the other hand, the inner bearing ring 3 is provided concentrically with the outer bearing ring 1, and the inner bearing ring 3 rotates during use. The inner bearing ring 3 has a hub 4 and an inner ring 5, and spline grooves 6 are formed on an inner peripheral surface of the hub 4. A mounting flange 7 is formed on an outer peripheral surface of an outer end portion of the hub 4. At the time of assembly to a vehicle, a drive shaft that is rotationally driven is inserted into the spline grooves 6 via a constant velocity joint, and a wheel is fixed to the mounting flange 7.

Two rows of outer ring raceway surfaces 8, 8 are formed on an inner peripheral surface of the outer bearing ring 1, and inner ring raceway surfaces 9, 9 are formed at positions facing the outer ring raceway surfaces 8, 8 in the hub 4 and the inner ring 5. Accordingly, two pairs of opposing raceway surfaces are formed.

In addition, rolling elements 10, 10 are rollably disposed between the outer ring raceway surfaces 8, 8 and the inner ring raceway surfaces 9, 9, and accordingly, the inner bearing ring 3 is rotatably held inside the outer bearing ring 1. Further, a cage 11 is provided between the adjacent rolling elements 10 between the outer ring raceway surfaces 8 and the inner ring raceway surfaces 9, and accordingly, the rolling elements 10 can roll at low torque.

Further, a seal device 14 is provided between one end portion of the outer bearing ring 1 in an axial direction and the inner ring 5 (see FIG. 2), and a seal member 12b is provided between the other end portion of the outer bearing ring 1 in the axial direction and the hub 4. The seal device 14 and the seal member 12b close an opening end portion of a space 13 in which the rolling elements 10, 10 are disposed between the inner peripheral surface of the outer bearing ring 1 and an outer peripheral surface of the inner bearing ring 3.

Subsequently, as shown in FIG. 2, the seal device 14 includes a seal member 12a that is attached to the outer bearing ring 1 and includes a core metal 110 and an elastic member 107, and a slinger 106 that is attached to the inner ring 5 of the inner bearing ring 3.

The core metal 110 is formed in an annular shape having a substantially L-shaped cross section, and is integrally formed by, for example, subjecting a metal plate such as a low-carbon steel plate to punching and plastic working such as press working.

The slinger 106 is also formed in an annular shape having an L-shaped cross section, and is integrally formed by subjecting a metal plate having excellent corrosion resistance, such as a stainless steel plate, to punching and plastic working such as press working.

The elastic member 107 is made of an elastic material, and includes an outer seal lip 114, an intermediate seal lip 115, and an inner seal lip 116, and a base end portion thereof is bonded and fixed to the core metal 105. Distal edges of the outer seal lip 114, the intermediate seal lip 115, and the inner seal lip 116 are in sliding contact with an inner surface of the slinger 106.

In the embodiment, a predetermined grease composition is sealed in a gap portion 121 formed by the adjacent outer seal lip 114 and the intermediate seal lip 115 and the inner surface of the slinger 106 which is the sliding surface of the outer seal lip 114 and the intermediate seal lip 115, and a gap portion 122 formed by the intermediate seal lip 115 and the inner seal lip 116 and the inner surface of the slinger 106 which is the sliding surface of the intermediate seal lip 115 and the inner seal lip 116.

Since the grease composition contains a base oil and a specific polar polymer, an oil film thickness can be increased by a thickening effect of a polymer, and the grease composition can be effectively held between the outer seal lip 114, the intermediate seal lip 115, and the inner seal lip 116 and the inner surface of the slinger 106 which is the sliding surface.

As a result, it is possible to achieve low torque without impairing seal performance for preventing dust, water, muddy water, and the like from entering the bearing from outside.

Similarly, in the seal member 12b as shown in FIG. 3, the grease composition can be used.

The seal member 12b shown in FIG. 3 includes a core metal 216 and an elastic member 217, each of which is formed in a circular ring shape. The core metal 216 is formed by processing a metal plate, and is fitted and fixed to an outer end portion of the outer bearing ring 1. The elastic member 217 is made of an elastic material and includes an outer-diameter-side side seal lip 218, an inner-diameter-side side seal lip 219, and a radial seal lip 220.

A base portion of the elastic member 217 is bonded and fixed to the core metal 216 with an adhesive or the like.

In the embodiment, the predetermined grease composition is sealed in a gap portion 221 between the outer-diameter-side side seal lip 218 and the inner-diameter-side side seal lip 219 and an inner surface of the inner bearing ring 3 which is the sliding surface of the outer-diameter-side side seal lip 218 and the inner-diameter-side side seal lip 219, and a gap portion 222 between the inner-diameter-side side seal lip 219 and the radial seal lip 220 and the inner surface of the inner bearing ring 3 which is the sliding surface of the inner-diameter-side side seal lip 219 and the radial seal lip 220.

Therefore, as in the case of the seal device 14, it is possible to achieve low torque without impairing seal performance for preventing dust, water, muddy water, and the like from entering the bearing from outside.

[2. Grease Composition]

Next, the grease composition according to the embodiment will be described in detail. The grease composition according to the embodiment contains the base oil and the polar polymer, and further contains a thickener and, if necessary, an additive.

<2-1. Base Oil>

The base oil is a main component of the grease composition according to the embodiment. For example, the grease composition can be prepared by dispersing a thickener added in the base oil.

The base oil used in the embodiment is preferably a low-viscosity base oil having a kinematic viscosity at 40° C. of 5 to 40 $mm^2/s$.

In a low-viscosity base oil grease used in a sealing device in the related art, the kinematic viscosity of the base oil at 40° C. is preferably, for example, 10 to 40 $mm^2/s$. However, when the kinematic viscosity of the base oil at 40° C. is smaller than, for example, 10 $mm^2/s$, fluidity of the grease composition is large, the grease composition is not held between the seal lip and the sliding surface, and the grease may be sprayed due to the sliding. The spray of grease refers to both a phenomenon in which the grease is released as fine particles and a phenomenon in which the grease is evaporated.

In the embodiment, as to be described later, a polar polymer having a specific weight-average molecular weight is used as an additive of the grease composition. When such a specific polar polymer is contained in the grease composition, an electrostatic force acts between the seal lip and the sliding surface and the grease due to a polar group of the polar polymer, and it is considered that wettability between the seal lip and the sliding surface surface and the grease can be improved.

In addition, when the polar polymer functions as a surfactant, an electrostatic interaction acts between the polar group of the polar polymer and the thickener, and an interaction such as a van der Waals force acts between a non-polar group and the base oil. As a result, it is considered that the wettability of the thickener to the base oil can be improved.

Due to an effect of the polar polymer as described above, it is possible to prevent the grease composition from being sprayed from a sliding portion during sliding.

When the kinematic viscosity of the base oil at 40° C. is 5 $mm^2/s$ or more, desired heat resistance is obtained, and therefore, it is possible to prevent volatilization of the base oil over time during use, and to maintain the seal performance. Therefore, the kinematic viscosity of the base oil at 40° C. is preferably 5 $mm^2/s$ or more, and more preferably 8 $mm^2/s$ or more.

On the other hand, when the kinematic viscosity of the base oil at 40° C. is 40 $mm^2/s$ or less, an increase in sliding friction resistance on the sliding surface can be prevented, and low torque can be achieved. Therefore, the kinematic viscosity of the base oil at 40° C. is preferably 40 $mm^2/s$ or less, and more preferably 20 $mm^2/s$ or less.

A type of the base oil used in the embodiment is not particularly limited, and oils used as the base oil of a lubricating oil (a mineral oil-based, a synthetic oil-based, or a natural oil-based lubricating oil) can all be used.

Specific examples of a mineral oil-based lubricating base oil include those obtained by refining a mineral oil by appropriately combining vacuum distillation, oil agent deasphalting, solvent extraction, hydrocracking, solvent dewaxing, sulfuric acid washing, clay refining, and hydrorefining.

Examples of a synthetic oil-based lubricating oil base oil include a hydrocarbon-based oil, an aromatic oil, an ester-based oil, an ether-based oil, a fluorine-based oil, and a silicone-based oil.

Further, examples of a natural oil-based lubricating base oil include oleaginous oils such as beef tallow, lard, a soybean oil, a rapeseed oil, a rice bran oil, a coconut oil, a palm oil and a palm kernel oil, and hydrides thereof. However, when, for example, nitrile rubber, which is most frequently used, is used as a material of the elastic member in the seal member or the seal device, the mineral oil or the synthetic hydrocarbon-based oil is preferably used.

Examples of the synthetic hydrocarbon-based oil include poly-α-olefin (PAO) and gas to liquid (GTL), which are synthetic oils. Since the poly-α-olefin has a high viscosity index, a high temperature, a decrease in viscosity is small, and an ability to hold an oil film is strong, and, at a low temperature, the viscosity is not too high, and appropriate fluidity is maintained, such that a decrease in lubricity is small. Such excellent low-temperature fluidity is an extremely effective function when the PAO is used as the base oil of the grease composition.

For example, when a lubricating oil having an extremely high viscosity at a low temperature and losing the fluidity is used as the base oil of the grease composition, the grease composition itself also completely loses the fluidity, so that almost no grease composition is supplied to a sliding surface of a mechanical part, which may accelerate wear. On the other hand, since the grease composition containing the base oil having excellent low-temperature fluidity such as the poly-α-olefin has the fluidity, an appropriate amount of lubricating oil can be supplied to the sliding surface, a lubricating function is maintained, and the wear on the sliding surface can be reduced.

A liquid hydrocarbon is synthesized by a Fischer-Tropsch process of a liquid fuel technology of natural gas, and the GTL, which is obtained based on the synthesized liquid hydrocarbon, has an extremely low sulfur content and an aromatic content, and an extremely high paraffin composition ratio, as compared with the mineral oil base oil refined from a crude oil. Therefore, since oxidation stability is excellent and evaporation loss is very small, the GTL can be suitably used as the base oil according to the embodiment.

<2-2. Polar Polymer>

The polar polymer contained in the grease composition according to the embodiment is a polymer containing a polar group and a non-polar group in a polymer structure. As described above, when the grease composition contains the polar polymer, the oil film thickness between the seal lip and the sliding surface can be increased by the thickening effect of the polar polymer or the like.

In addition, even when a low-viscosity base oil having a low polarity or no polarity is used as the base oil of the grease composition, a grease shape can be held by containing a specific polar polymer, and the grease composition can be prevented from being sprayed due to stirring and sliding.

Further, when a low-polarity synthetic hydrocarbon-based oil or the like is used as the base oil, and a thickener having a polar group (a urea bond and the like) such as a urea compound is used as the thickener, durability and wettability can be improved when the grease composition contains the specific polar polymer.

An effect of the polar polymer will be described in detail below. The PAO, which can be suitably used as the base oil, has poor wettability to a metal surface, a rubber surface, and the like, but low attacking properties to rubber. In addition, The PAO has little change in viscosity due to the temperature, and is excellent in the durability.

On the other hand, aliphatic urea, which is suitably used as a thickener to be described later, is not good in compatibility with the PAO, and has properties of being prone to oil separation. In addition, although the aliphatic urea is originally hard and is likely to be softened by shearing, the durability is good.

The grease composition containing such a base oil and a thickener has excellent durability, but is poor in wettability (adhesion), and thus is in a state of being likely to be sprayed without staying at a predetermined place.

Therefore, when a specific polar polymer is contained as in the grease composition according to the embodiment, an electrostatic interaction acts between the polar group of the polar polymer and the polar group of the thickener.

Further, an interaction such as a van der Waals force acts between the non-polar group of the polar polymer and the base oil, and the polar polymer functions as a surfactant, such that the wettability of the thickener to the base oil can be improved.

In the rolling device according to the embodiment, the seal member has a plurality of seal lips made of an elastic material such as nitrile rubber or acrylic rubber, and the seal lips slide on, for example, a surface of the slinger 106 made of steel or a surface of the inner bearing ring 3 made of steel.

Therefore, when the grease composition containing the polar polymer is present in the sliding portion, the electrostatic interaction acts between a polar group (such as an ester group) of the polar polymer dissolved in the base oil and a polar group on a surface of the seal lips (a polar group such as a nitrile group in the case of the nitrile rubber, and an ester bond in the case of the acrylic rubber) and iron molecules in the sliding surface. As a result, it is possible to prevent the grease composition from being sprayed from a sliding portion during sliding. Further, even when a low-viscosity base oil is used in a portion where the seal member 12a and the seal member 12b in the rolling device are provided, the grease composition can be held between the seal lips and the sliding surface and in the vicinity thereof, and the seal performance can be maintained.

Due to the effect of the polar polymer as described above, even when the low-viscosity base oil is used, the grease composition can be stably present between the seal lips and the sliding surface, and both the low torque and the seal performance can be achieved.

Here, examples of the non-polar group of the polar polymer include hydrocarbon-based functional groups such as a methyl group and an ethyl group, each of which is composed of C and H.

The polar group of the polar polymer refers to a functional group other than the non-polar group, and examples thereof include functional groups containing elements other than C and H such as O, N, and S and having a charge bias in molecules. Examples of the polar group include a hydroxy group, an alkoxy group, an amino group, an amide group, a carbonyl group, a carboxy group, a cyano group, a formyl group, a nitro group, a sulfo group, an amide bond, a peptide bond, a urea bond, a urethane bond, and an ester bond.

The polar polymer is soluble in the base oil, and is not particularly limited as long as a weight-average molecular weight to be described later is within a specified range, and examples thereof include polymethacrylate, polyacrylate, styrene-maleic anhydride copolymer, olefin-maleic anhydride copolymer, polyurethane, polyester, and ethylene oxide-propylene oxide copolymer, and these compounds may be used alone or in combination of two or more.

In addition, the polar polymer may contain other functional groups as long as the effects according to the present disclosure are not impaired.

Among the above-described polar polymers, it is more preferable to use at least one of polymethacrylate and polyacrylate from the viewpoint of torque and seal performance.

When the weight-average molecular weight of the polar polymer is less than 5000, the thickening effect is hardly obtained. Therefore, the weight-average molecular weight of the polar polymer is preferably 5000 or more and 140000 or less.

On the other hand, when the weight-average molecular weight of the polar polymer is more than 140000, the viscosity of the grease composition is too high, and it is difficult to uniformly disperse the polar polymer in the grease composition, and it is difficult for the polar polymer to enter between the seal lips and the sliding surface, and the effect of improving the oil film thickness cannot be obtained. Therefore, the weight-average molecular weight of the polar polymer is preferably 140000 or less, and is preferably 50000 or less.

Further, in order to obtain the above-described effect by addition of the polar polymer, a content of the polar polymer is preferably 0.5 mass % or more, more preferably 1.0 mass % or more, and even more preferably 1.5 mass % or more with respect to a total mass of the grease composition.

On the other hand, when the content of the polar polymer is 30 mass % or less with respect to the total mass of the grease composition, the viscosity of the grease composition is too high, and an increase in torque can be prevented. Therefore, the content of the polar polymer is preferably 30 mass % or less, more preferably 28 mass % or less, and even more preferably mass % or less with respect to the total mass of the grease composition.

In the embodiment, a solution containing a polar polymer and, for example, an oil may be contained in the grease composition as an additive. In such a case, the content of the polar polymer means a "substantial polymer concentration" of the polar polymer. The substantial polymer concentration indicates a concentration of the polymer actually contained in the grease composition and is a value that can be calculated by multiplying an addition amount of the solution by a ratio of the polar polymer in the solution.

<2-3. Thickener>

The thickener is a component that disperses in the base oil to form a three-dimensional structure and holds the base oil in the three-dimensional structure, thereby making the base oil semi-solid, and can be contained in the grease composition.

As the thickener, for example, metal soaps such as metal soaps containing Li and Na as metal components, composite metal soaps containing Li, Na, Ba, and Ca as metal components, non-soaps such as benton, silica gel, urea compounds, urea and urethane compounds, and urethane compounds, amino acid-based gelling agents (such as N-2-ethylhexanoyl-L-glutamic acid dibutylamide, and N-lauroyl-L-glutamic acid-α, γ-n-dibutylamide), and benzylidene sorbitol derivatives (such as dibenzylidene sorbitol, ditrilidene sorbitol, and asymmetric dialkyl benzylidene sorbitol) may be appropriately selected and used.

These thickeners may be used alone or as a mixture.

Among these thickeners, it is preferable to use the urea compound that is reacted and produced by isocyanate and primary amine. A urea group contained in the urea compound may be any of diurea, triurea, tetraurea, pentaurea, and hexaurea. A type of the urea compound may be any of aliphatic urea, alicyclic urea, and aromatic urea. Further, for example, urea having a group other than the urea group such as a urethane group (for example, urea urethane) may be used.

Among the above-described thickeners, the aliphatic urea can reduce seal torque as compared with the aromatic urea and the alicyclic urea. One of the reasons for this is considered to be that the aliphatic urea tends to soften the grease due to a shearing force, and thus has lower stirring resistance than other urea. Therefore, in the embodiment, it is preferable to use aliphatic diurea obtained by reacting 1 mol of diisocyanate with 2 mol of an aliphatic primary monoamine.

Hereinafter, examples of various raw materials used for synthesizing the urea compound will be described.

Examples of diisocyanate include aliphatic diisocyanate, alicyclic diisocyanate, and aromatic diisocyanate. More specific examples thereof include 4,4'-diphenylmethane diisocyanate (MDI), tolylene diisocyanate (TDI), naphthalene diisocyanate, p-phenylene diisocyanate, trans-1,4-cyclohexane diisocyanate (CHDI), 1,3-bis-(isocyanatomethyl) benzene, 4,4'-dicyclohexylmethane diisocyanate (H12MDI), 1,3-bis-(isocyanatomethyl) cyclohexane (H6XDI), hexamethylene diisocyanate (HDI), 3-isocyanatomethyl-3,3,5'-trimethylcyclohexyl isocyanate (IPDI), phenylene diisocyanate, m-tetramethylxylene diisocyanate (m-TMXDI), and p-tetramethylxylene diisocyanate (p-TMXDI), and in particular, the 4,4'-diphenylmethane diisocyanate (MDI), the tolylene diisocyanate (TDI), the trans-1,4-cyclohexane diisocyanate (CHDI), and the 4,4'-dicyclohexylmethane diisocyanate (H12MDI) are preferably used.

Examples of the primary monoamine include aliphatic, alicyclic, and aromatic monoamines. Here, examples of aliphatic amines include saturated or unsaturated aliphatic amines of $C_8$ to $C_{24}$, which are branched aliphatic amines and linear chain aliphatic amines, and in particular, the linear chain aliphatic amine is preferably used. Specific examples thereof include octylamine, decylamine, dodecylamine, tetradecylamine, hexadecylamine, octadecylamine, oleylamine, aniline, p-toluidine, and cyclohexylamine.

A content of the thickener in the grease composition is preferably from 5 mass % to mass %, and more preferably from 5 mass % to 20 mass %, with respect to the total mass of the grease composition. When the content of the thickener is 5 mass % or more, a grease state can be easily maintained. When the content of the thickener is 40 mass % or less, hardness of the grease composition can be appropriately maintained, and a lubricating state can be sufficiently exhibited.

<2-4. Other Additives>

In the embodiment, various additives may be mixed as desired in order to improve various kinds of performance of the grease composition.

Examples of the additives include antioxidants, such as amine-based, phenol-based, sulfur-based, zinc dithiophosphate and zinc dithiocarbamate; rust inhibitors, such as sulfonate metal salt, ester, amine, naphthenate metal salt and succinic acid derivatives; extreme pressure agents, such as phosphorus-based, zinc dithiophosphate and organomolybdenum; oily improvers, such as fatty acid and an animal and vegetable oil; and metal deactivators, such as benzotriazole, and the additives used in the lubricating oil can be used alone or in combination of two or more.

An addition amount of these additives is not particularly limited as long as the object of the present disclosure is not impaired.

The grease composition according to the embodiment is described above.

As described above, the present disclosure relates to a grease composition used for a seal portion of a rolling device, and relates also to a rolling device in which the above-described predetermined grease composition is sealed in a gap portion between two adjacent seal lips of a seal member and a sliding surface on which the seal lips slide.

The rolling device is not limited to the radial bearing described in FIGS. 1 to 3, and any rolling device including a seal member that closes an opening end portion of a space formed between a pair of bearing rings can be applied. For example, a thrust bearing may be used. Further, the rolling elements are not limited to balls, and the present disclosure can be applied to rollers.

EXAMPLES

A grease composition having a composition shown in Table 1 below was prepared, and the obtained grease composition was sealed in a test seal device as shown in FIG. 3. Next, the obtained test seal device was mounted on a hub seal unit muddy water durability tester (manufactured by NSK Ltd.), and was rotated in a muddy water tank under the following test conditions to evaluate muddy water durability life (seal performance). Further, the test seal device was mounted on a hub seal unit torque tester (manufactured by NSK Ltd.), and was rotated under the following test conditions to evaluate seal torque.

Figure 4:
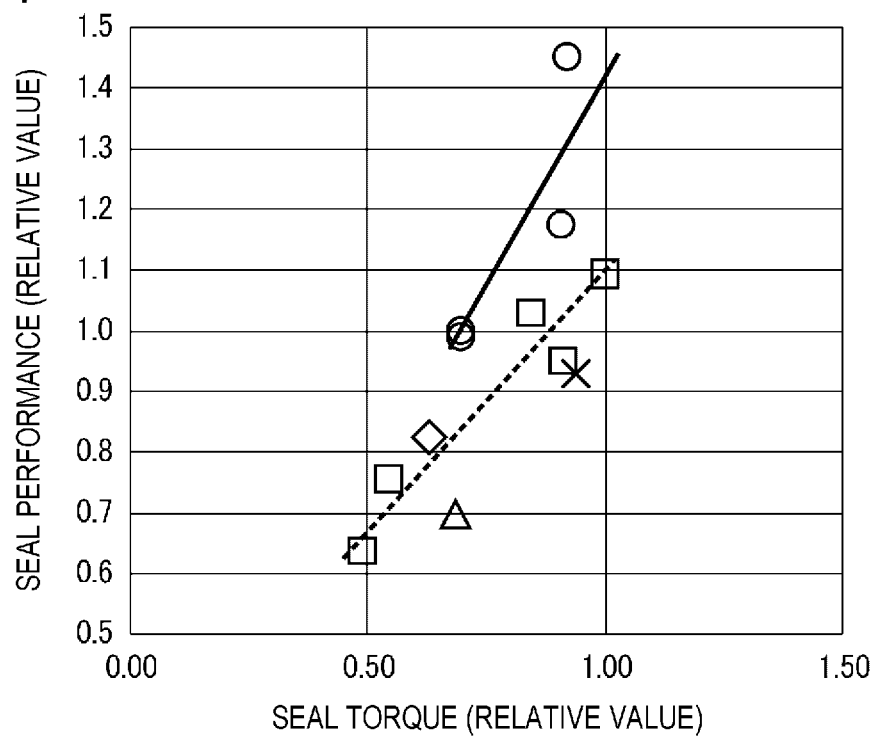
FIG. 4 is a graph showing a relationship between seal performance and seal torque of each of Examples and Comparative Examples.

Results are shown in Table 1 and also shown in FIG. 4. The seal performance shown in Table 1 below is a relative value with respect to a standard value defined by NSK Ltd. (a result shown in Example No. 1 is "1.00"), and the larger the numerical value, the better the seal performance. Similarly, the seal torque shown in Table 1 below is a relative value when a result shown in Comparative Example No. 1 is 1.00, and the smaller the numerical value, the lower the torque.

In Table 1, "Aclube" added to Example Nos. 1 to 4 and Comparative Example No. 7 includes poly(meth)acrylate and an oil for improving handling properties. An effective concentration in Table 1 represents a content of poly(meth)acrylate in an additive, and a substantial polymer concentration represents a value obtained by multiplying an addition amount of "Aclube" by the effective concentration.

<Evaluation of Seal Performance>
(Seal Unit Muddy Water Durability Test Conditions)
  Seal size: inner diameter of 61 mm, outer diameter of 75 mm
  Rotation speed: 1000 min$^{-1}$
  Total indicator reading (TIR): 0.2 mm
  Muddy water composition: contain 20% of JIS class 8 dust
  Atmosphere temperature: room temperature <Evaluation of Seal Torque>
(Seal Unit Torque Test Conditions)
  Seal size: inner diameter of 61 mm, outer diameter of 75 mm
  Rotation speed: 1000 min$^{-1}$
  Atmosphere temperature: room temperature

TABLE 1

| | | Composition of grease composition | | | | | |
|---|---|---|---|---|---|---|---|
| | | Base oil | | | Polymer (additive) | | |
| No. | | Type | Viscosity at 40° C. (mm$^2$/s) | thickener Type | Type | Commodity name | Addition amount (mass %) |
| Examples | 1 | PAO | 9.3 | Aliphatic diurea | Poly(meth)acrylate | Aclube A1060 (manufactured by Sanyo Chemical Industries, Ltd.) | 9 |
| | 2 | | | | | | 27 |
| | 3 | | | | | Aclube 812 (manufactured by Sanyo Chemical Industries, Ltd.) | 9 |
| | 4 | | | | | | 27 |
| Comparative Examples | 1 | Mineral oil | 75 | Aromatic diurea | | | |
| | 2 | PAO | 5.5 | Aliphatic diurea | | | |
| | 3 | | 9.3 | | | | |
| | 4 | Mineral oil | 10 | | | | |
| | 5 | PAO | 18 | | | | |
| | 6 | | 31 | | | | |
| | 7 | | 9.3 | | Poly(meth)acrylate | Aclube V5091 (manufactured by Sanyo Chemical Industries, Ltd.) | 9 |
| | 8 | | | | Styrene-isoprene polymer | Infineum SV150 (manufactured by Infineum Japan Co., Ltd.) | 7.7 |

TABLE 1-continued

| | | Composition of grease composition | | | | Evaluation result | |
|---|---|---|---|---|---|---|---|
| | | Polymer (additive) | | | | | |
| No. | | Effective concentration (%) | Substantial polymer concentration (mass %) | Weight-average molecular weight | Presence or absence of polarity | Seal torque (relative value) | Seal performance (relative value) |
| Examples | 1 | 60 | 5.4 | 30000 | Presence | 0.70 | 1.00 |
| | 2 | | 16.2 | | | 0.91 | 1.18 |
| | 3 | 79 | 7.1 | 30000 | | 0.70 | 0.99 |
| | 4 | | 21.3 | | | 0.92 | 1.45 |
| Comparative Examples | 1 | | | | | 1.00 | 1.10 |
| | 2 | | | | | 0.49 | 0.64 |
| | 3 | | | | | 0.63 | 0.83 |
| | 4 | | | | | 0.55 | 0.76 |
| | 5 | | | | | 0.91 | 0.95 |
| | 6 | | | | | 0.85 | 1.03 |
| | 7 | 18 | 1.6 | 150000 | Presence | 0.68 | 0.70 |
| | 8 | | | 100000~200000 | Absence | 0.94 | 0.93 |

<Results and Discussion>

FIG. 4 is a graph showing a relationship between the seal performance and the seal torque of each of Examples and Comparative Examples. In FIG. 4, patterns of "○" represent Example Nos. 1 to 4. In addition, patterns of "□" represent Comparative Example Nos. 1, 2 and 4 to 6, and a pattern of "◇" represents Comparative Example No. 3. Further, a pattern of "Δ" represents Comparative Example No. 7, and a pattern of "x" represents Comparative Example No. 8.

As shown in the patterns of "□" and "◇" shown in Comparative Example Nos. 1 to 6 in FIG. 4 and Table 1, a value of the seal torque decrease as the viscosity of the base oil decreases, whereas the seal performance decreases. That is, the seal torque and the seal performance are in a trade-off relationship as indicated by a straight line (a broken line) in FIG. 4.

In Example Nos. 1 to 4 (the patterns of "○" in FIG. 4), poly(meth)acrylate-containing "Aclube A1060" or "Aclube 812" (manufactured by Sanyo Chemical Industries, Ltd.) was added to the grease composition in Comparative Example No. 3 (the pattern of "◇" in FIG. 4) to have a content of 9 mass % or 27 mass %. Also for the patterns of "○" representing Example Nos. 1 to 4, the value of the seal torque increases as the seal performance increases, indicating a trade-off relationship as indicated by a straight line (a solid line) in FIG. 4.

In Example Nos. 1 to 4, poly(meth)acrylate, which is a polar polymer, was contained in the grease composition, and the solid line representing Example Nos. 1 to 4 (the patterns of "○" in FIG. 4) was positioned above the broken line representing Comparative Example Nos. 1, 2, and 4 to 6, and therefore, it can be understood that both low torque and seal performance are achieved as compared with Comparative Examples.

That is, when compared with the value of the same seal torque, the seal performance is better in Examples than in Comparative Examples, and when compared with the same seal performance, the seal torque is lower in Examples than in Comparative Examples.

In Comparative Example No. 7 (the pattern of "Δ" in FIG. 4), poly(meth)acrylate-containing "Aclube V5091" (manufactured by Sanyo Chemical Industries, Ltd.) was added to the grease composition in Comparative Example No. 3 (the pattern of "◇" in FIG. 2) to have a content of 9 mass %. The weight-average molecular weight of the poly(meth)acrylate contained in the grease composition in Comparative Example No. 7 was 150000.

In Comparative Example No. 7, since the weight-average molecular weight of the polar polymer exceeded an upper limit of a range according to the present disclosure, a result of achieving both high seal performance and low torque could not be obtained.

Comparative Example No. 8 (the pattern of "x" in FIG. 4) is a grease composition in which "InfineumSV 150" (manufactured by Infineum Japan Co., Ltd.) containing a styrene-isoprene polymer was added to a grease composition of Comparative Example No. 3 (the pattern of "◇" in FIG. 2).

Since the styrene-isoprene polymer was a non-polar polymer having no polar group in the polymer structure, the seal performance of Comparative Example No. 8 could be improved as compared with that of Comparative Example No. 3, whereas the torque also increased accordingly, and it was not possible to obtain the result of achieving both high seal performance and low torque.

Although the embodiment and the variation thereof are described above with reference to the drawings, it is needless to mention that the present disclosure is not limited to these examples. It is apparent for those skilled in the art to which the present disclosure belongs that various modified examples or corrected examples are conceivable within the scope recited in the claims, and it is understood that the above falls within the technical scope of the present disclosure. In addition, within the scope not departing from the gist of the disclosure, each of the configuration elements in the above-described embodiment may be combined in any manner.

The present application is based on a Japanese Patent Application (No. 2020-193495) filed on Nov. 20, 2020, the contents of which are incorporated herein by reference.

REFERENCE SIGNS LIST

1 Outer bearing ring
3 Inner bearing ring
4 Hub
5 Inner ring
8 Outer ring raceway surface
9 Inner ring raceway surface
10 Rolling element
12a, 12b Seal member 14 Seal device
20 Rolling device
106 Slinger
107, 217 Elastic member
110, 216 Core metal
114, 115, 116, 218, 219, 220 Seal lip
121, 122, 221, 222 Gap portion

The invention claimed is:

1. A grease composition to be used in a rolling device comprising a pair of bearing rings having a pair of opposing raceway surfaces, a plurality of rolling elements rollably held between the pair of raceway surfaces, and a seal member closing an opening end portion of a space formed between the pair of bearing rings, wherein the seal member has a plurality of seal lips made of an elastic material, wherein
the grease composition is filled in a gap portion between a sliding surface on which the seal lips of one of the pair of bearing rings slide and two adjacent seal lips, and the grease composition comprises:
a base oil; and a polar polymer, wherein
a weight-average molecular weight of the polar polymer is from 5000 to 140000, and
a kinematic viscosity of the base oil at 40° C. is 5 $mm^2/s$ or more and 20 $mm^2/s$ or less.

2. The grease composition according to claim 1, wherein the polar polymer is at least one selected from polyacrylate, polymethacrylate, styrene-maleic anhydride copolymer, olefin-maleic anhydride copolymer, polyurethane, polyester, and ethylene oxide-propylene oxide copolymer.

3. The grease composition according to claim 2, wherein the polar polymer is at least one selected from polyacrylate and polymethacrylate.

4. A rolling device comprising: a pair of bearing rings having a pair of opposing raceway surfaces; a plurality of rolling elements rollably held between the pair of raceway surfaces; and a seal member closing an opening end portion of a space formed between the pair of bearing rings, the seal member having a plurality of seal lips made of an elastic material, wherein
a grease composition is filled in a gap portion between a sliding surface on which the seal lips of one of the pair of bearing rings slide and two adjacent seal lips,
the grease composition contains a base oil and a polar polymer, and
a weight-average molecular weight of the polar polymer is from 5000 to 140000, and
a kinematic viscosity of the base oil at 40° C. is 5 $mm^2/s$ or more and 20 $mm^2/s$ or less.

5. The grease composition according to claim 1, wherein the polar polymer is at least one selected from polyacrylate, polymethacrylate, styrene-maleic anhydride copolymer, olefin-maleic anhydride copolymer, polyurethane, polyester, and ethylene oxide-propylene oxide copolymer.

6. The grease composition according to claim 5, wherein the polar polymer is at least one selected from polyacrylate and polymethacrylate.

7. The grease composition according to claim 1, wherein the weight-average molecular weight of the polar polymer is from 5000 to 50000.

8. The grease composition according to claim 1, wherein a content of the polar polymer is 0.5% to 28% by mass with respect to a total mass of the grease composition.

* * * * *